United States Patent
Choi

(10) Patent No.: US 6,597,235 B2
(45) Date of Patent: Jul. 22, 2003

(54) VOLTAGE BOOST CIRCUITS USING MULTI-PHASE CLOCK SIGNALS

(75) Inventor: Hee-cheol Choi, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/043,029

(22) Filed: Jan. 9, 2002

(65) Prior Publication Data

US 2002/0101277 A1 Aug. 1, 2002

(30) Foreign Application Priority Data

Jan. 27, 2001 (KR) .......................................... 2001-3889

(51) Int. Cl.[7] .............................. H02M 3/07; G05F 1/45
(52) U.S. Cl. ......................... 327/536; 327/537; 363/60
(58) Field of Search .............................. 327/534, 535, 327/536, 537; 363/59, 60; 307/110; 365/189.09, 226

(56) References Cited

U.S. PATENT DOCUMENTS

| | | | | |
|---|---|---|---|---|
| 5,036,229 A | * | 7/1991 | Tran ............................ | 327/536 |
| 5,502,415 A | * | 3/1996 | Matsui et al. ................ | 327/536 |
| 5,553,030 A | * | 9/1996 | Tedrow et al. ............... | 365/226 |
| 5,712,777 A | * | 1/1998 | Nicollini et al. ............. | 363/60 |
| 6,055,201 A | * | 4/2000 | Foss et al. ................... | 365/226 |
| 6,154,411 A | * | 11/2000 | Morishita .................... | 365/226 |

OTHER PUBLICATIONS

Cho et al., "A 10b, 20Msample/s, 35 mW Pipeline A/D Converter," IEEE Journal of Solid–State Circuits, vol. 30, No. 3, Mar. 1995, pp. 166–172.
Nicollini et al., A–80 dB THD, 4Vpp Switched Capacitor Filter for 1.5 V Battery–Operated Systems, IEEE Journal of Solid–State Circuits, vol. 31, No. 8, Aug. 1996, pp. 1214–1219.
Hidaka et al., "A Divided/Shared Bit–Line Sensing Scheme for ULSI DRAM Cores," IEEE Journal of Solid–State Circuits, vol. 26, No. 4, Apr. 1991, pp. 473–478.

* cited by examiner

Primary Examiner—Timothy P. Callahan
Assistant Examiner—Terry L. Englund
(74) Attorney, Agent, or Firm—Myers Bigel Sibley & Sajovec

(57) ABSTRACT

A boost circuit, such as might be used to generate a boosted voltage in an integrated circuit device (e.g., an EEPROM), includes a plurality of charge pump circuits having outputs connected in common and that generate current pulses responsive to respective phased periodic signals. The boost circuit further includes a multi-phase periodic signal generator circuit that generates the phased periodic signals such that they have respective different phases. For example, the multi-phase periodic signal generator circuit may include a control signal generator circuit that produces a control signal responsive to a voltage produced by the plurality of charge pump circuits, and an oscillator circuit that generates the plurality of phased periodic signals responsive to the control signal. Related operating methods are described.

2 Claims, 3 Drawing Sheets ered by the power supply voltage applied to the memory device. This high voltage is typically generated by a voltage boost circuit (or multiplier) integrated with the memory circuit.

VOLTAGE BOOST CIRCUITS USING MULTI-PHASE CLOCK SIGNALS

RELATED APPLICATION

This application claims priority to Korean Application No. 2001-3889, filed Jan. 27, 2001, the disclosure of which is hereby incorporated herein by reference.

BACKGROUND OF THE INVENTION

The present invention relates to integrated circuits and methods of operation thereof, and more particularly, to boost circuits and methods of operating thereof.

Many integrated circuit devices internally utilize higher voltages than are supplied by an external power source. For example, a memory device, such as an electrically erasable and programmable read-only memory (EEPROM) or flash EEPROM, may use a higher reading voltage than is supplied by the power supply voltage applied to the memory device. This high voltage is typically generated by a voltage boost circuit (or multiplier) integrated with the memory circuit.

Many conventional voltage boost circuits use a charge pump that charges a capacitor to develop a boosted voltage. The size of the capacitor is typically determined by the frequency of an available internal clock signal used to operate the charge pump. For example, if the frequency of the internal clock signal is relatively low, an off-chip capacitor having a large capacitance may be required to achieve the desired voltage boost.

If an off-chip capacitor is used for the voltage boost circuit, the potential at the chip pad that forms a junction between the chip and the capacitor may become higher than a source voltage supplied to the chip. This may necessitate use of an additional circuit attached to the chip pad. Also, if the voltage boost circuit operates in a frequency range lower or higher than the designed frequency, the boosted voltage value may be changed.

Some conventional voltage boost circuits include an oscillator circuit that receives an external control signal and generates an internal clock signal, and a charge pump circuit that receives the internal clock signal and generates a boosted voltage responsive thereto. Some conventional voltage boost circuits may not control the boosted output voltage particularly well, and may produce unacceptable voltage ripple.

SUMMARY OF THE INVENTION

According to some embodiments of the present invention, a boost circuit, such as might be used to generate a boosted voltage in an integrated circuit device, (e.g., an EEPROM) is provided. The boost circuit includes a plurality of charge pump circuits having outputs connected in common and that generate current pulses responsive to respective phased periodic signals. The boost circuit further includes a multi-phase periodic signal generator circuit that generates the phased periodic signals such that they have respective different phases. In particular, the multi-phase periodic signal generator circuit may generate the phased periodic signals such that current pulses produced by the plurality of charge pump circuits are distributed over a repeating cycle.

In some embodiments, the multi-phase input signal generator circuit comprises a control signal generator circuit that produces a control signal responsive to a voltage produced by the plurality of charge pump circuits, and an oscillator circuit that generates the plurality of phased periodic signals responsive to the control signal. For example, the control signal generator circuit may produce the control signal responsive to a comparison of the voltage to a desired value. In some embodiments, the control signal generator circuit produces a control voltage responsive to a comparison of the voltage produced by the plurality of charge pump circuits to a desired value, and the oscillator circuit comprises a voltage controlled oscillator circuit that varies a frequency of the phased periodic signals responsive to the control voltage.

Related operating methods are also described.

DETAILED DESCRIPTION

Figure 1:
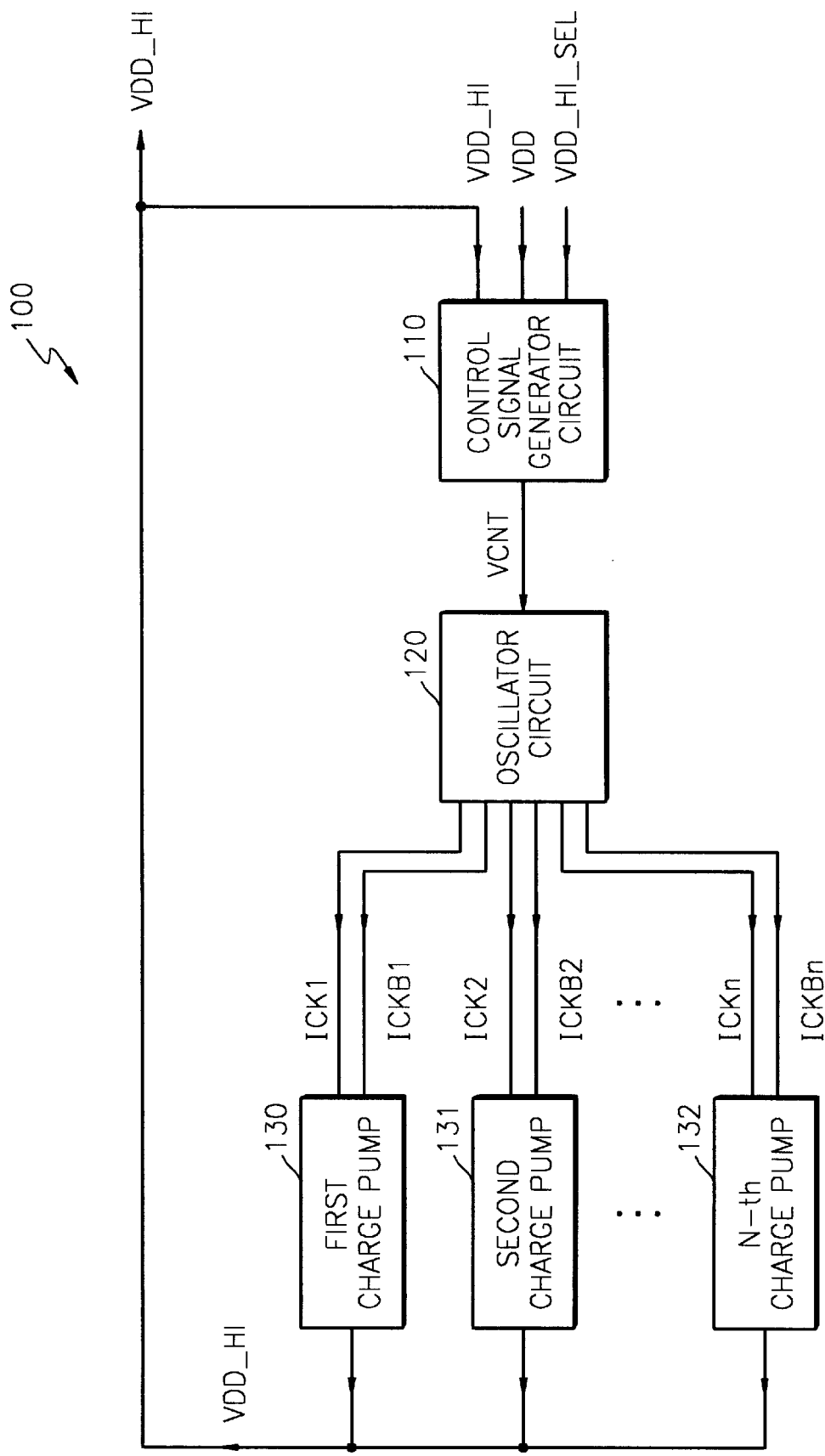
FIG. 1 is a schematic diagram illustrating a voltage boost circuit according to some embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

Referring to FIG. 1, a voltage boost circuit 100 according to some embodiments of the present invention includes a control signal generator circuit 110, an oscillator circuit 120, and charge pump circuits 130,131, . . . , 132. The control signal generator circuit 110 receives a boosted voltage VDD_HI and generates a control signal VCNT in response to a boost voltage select signal VDD_HI_SEL for controlling the value of the boosted voltage VDD_HI. The oscillator circuit 120 generates complementary pairs of internal clock signals ICK1, ICKB1, ICK2, ICKB2, . . . , ICKn, ICKBn in response to the control signal VCNT. The charge pump circuits 130, 131, . . . , 132 receive the pairs of internal clock signals ICK1, ICKBl, ICK2, ICKB2, . . . , ICKn, ICKBn and generate the boosted voltage VDD_HI responsively thereto.

The pairs of the internal clock signals ICK1, ICKB1, ICK2, ICKB2, . . . , ICKn, ICKBn have the same frequency but different phases. The oscillator circuit 120 controls frequency of the pairs of the internal clock signals ICK1, ICKB1, ICK2, ICKB2, . . . , ICKn, ICKBn responsive to the control signal VCNT generated by the control signal generator circuit 110. For example, the control signal VCNT may be a voltage and the oscillator circuit 120 may be a conventional voltage controlled oscillator or ring oscillator. The pairs of internal clock signals ICK1, ICKB1, ICK2, ICKB2, . . . , ICKn, ICKBn are applied to the plurality of charge pump circuits 130, 131, . . . , 132. Current pulses produced by the charge pump circuits 130, 131, . . . , 132 generate the boosted voltage VDD_HI by charging a capacitance (see FIG. 2).

The control signal generator circuit 110 raises the value of the control signal VCNT when the boosted voltage VDD_HI is lower than desired, thus increasing the frequency of the pairs of the internal clock signals ICK1, ICKB1, ICK2, ICKB2, . . . , ICKn, ICKBn. As the frequency of the pairs of the internal clock signals ICK1, ICKB1, ICK2, ICKB2, . . . , ICKn, ICKBn increases, the outputs of the charge pump circuits 130, 131, . . . , 132 increase, and the boosted voltage VDD_HI becomes higher. In contrast, if the boosted voltage (VDD_HI) is higher than desired, the value of the control signal (VCNT) is lowered, and the frequency of the pairs of the internal clock signals ICK1, ICKB1, ICK2, ICKB2, . . . , ICKn, ICKBn is decreased. If the frequency of the pairs of the internal clock signals ICK1, ICKB1, ICK2, ICKB2, . . . , ICKn, ICKBn is lowered, the outputs of the charge pump circuits 130, 131, . . . , 132 decrease, and the boosted voltage VDD_HI is lowered. The boosted voltage select signal VDD_HI_SEL represents the desired boosted voltage.

Figure 2:
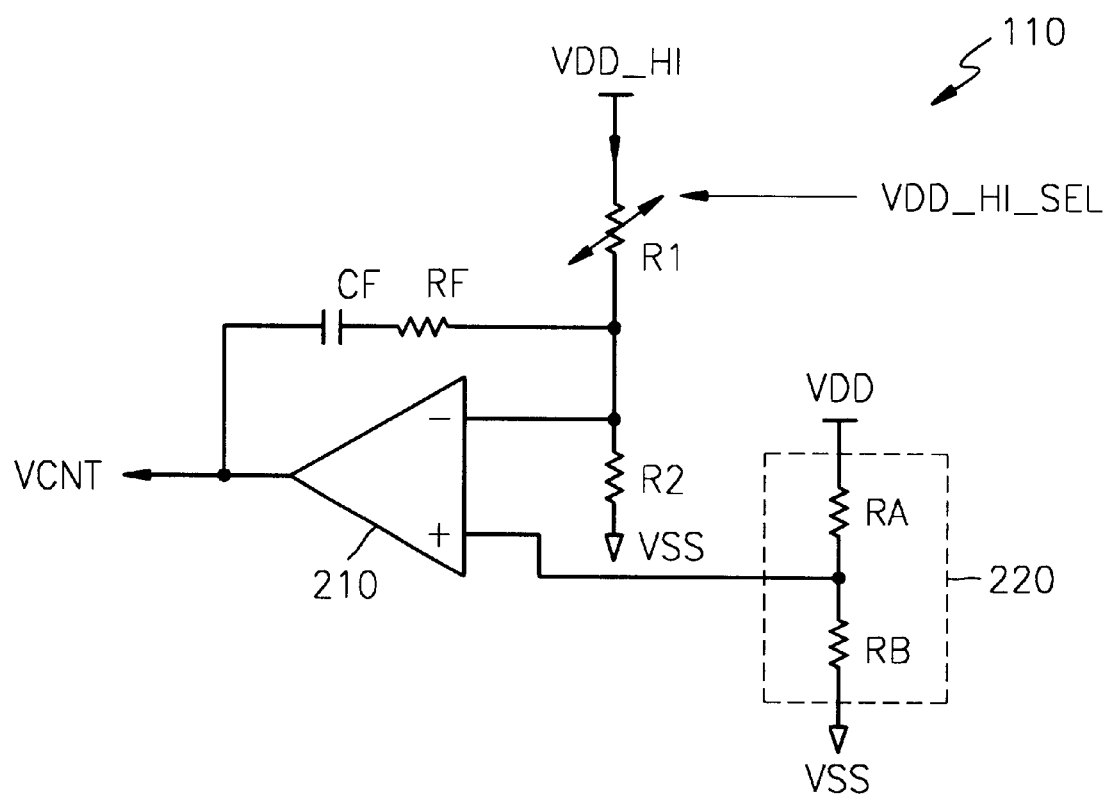
FIG. 2 is a schematic diagram illustrating a control signal generator circuit according to some embodiments of the present invention.

According to embodiments of the present invention illustrated in FIG. 2, the control signal generator circuit 110 includes a first variable resistor R1, a second resistor R2, a feedback network CF, RF, and a voltage divider circuit 220 that includes resistors RA, RB. One end of the first resistor R1 is connected to the boosted voltage VDD_HI, and the other end is connected to an inverting terminal of a differential amplifier 210. The resistance of the first resistor R1 varies in response to the boosted voltage select signal VDD_HI_SEL. One end of the second resistor R2 is connected to the inverting terminal of the differential amplifier 210, and the other end is connected to ground VSS. The feedback network CF, RF is connected between the inverting terminal of the differential amplifier 210 and an output terminal of the differential amplifier 210. The voltage divider circuit 220 includes resistors RA, RB connected in series between the source voltage VDD and the ground VSS, and applies a voltage derived from the source voltage VDD to a non-inverting terminal of the differential amplifier 210. The control signal generator circuit 110 acts as a filter, in particular, as a low pass filter.

The voltage divider circuit 220 applies a voltage to the differential amplifier 210 that is dependent on the relative values of the resistors RA, RB. For example, if the source voltage is 5 volts and the ratio of the resistors RA, RB is 1:1, 2.5 volts is applied to the non-inverting terminal of the differential amplifier 210. The first resistor R1 is a variable resistor that is responsive to the boosted voltage select signal VDD_HI_SEL. For example, if the boosted voltage select signal VDD_HI_SEL is a digital signal, the resistance of the first resistor R1 may be selected from one of several discrete resistance values.

Figure 3:
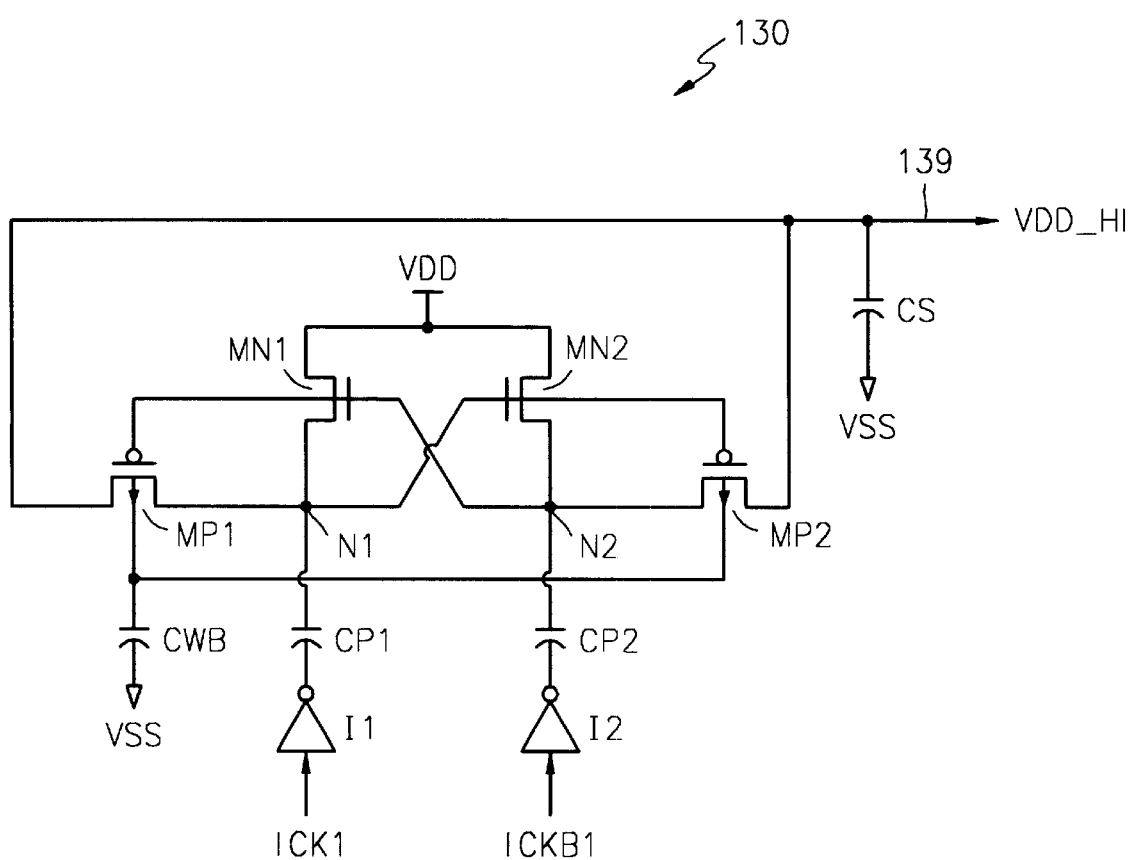
FIG. 3 is a schematic diagram illustrating a charge pump circuit according to some embodiments of the present invention.

According to embodiments of the present invention illustrated in FIG. 3, a charge pump circuit 130 includes inverters I1, I2 for receiving and inverting a pair of internal clock signals ICK, ICKB having a complementary phase. Capacitors CP1, CP2 are respectively connected to the inverters I1, I2. First and second NMOS transistors MN1, MN2 are connected to the source voltage VDD and to capacitors CP1, CP2 at nodes N1, N2. First and second PMOS transistors MP1, MP2 are connected between the first and second nodes N1, N2 and an output terminal 139 at which the boosted voltage VDD_HI is produced. A capacitor CWB is connected to the bulk regions of the first and second PMOS transistors MP1, MP2, and to the ground VSS, and a capacitor CS connected between the output terminal 139 and the ground VSS. Gates of the first NMOS transistor MN1 and the first PMOS transistor MP1 are connected to the second node N2. Gates of the second NMOS transistor MN2 and the second PMOS transistor MP2 are connected to the first node N1.

The inverters I1, I2 invert clock signals ICK, ICKB and apply the resultant signals to the capacitors CP1, CP2. The capacitor CWB prevents latch-up when the first and second PMOS transistors MP1, MP2 operate. The capacitors CP1, CP2 charge and discharge responsive to the clock signals ICK, ICKB.

The first and second NMOS transistors MN1, MN2 and the first and second PMOS transistors MP1, MP2 turn on or turn off according to voltage levels of the first and second nodes N1, N2. When the voltage level of the first node N1 is high and the voltage level of the second node N2 is low, the second NMOS transistor MN2 and the first PMOS transistor MP1 turn on, and the first NMOS transistor MN1 and the second PMOS transistor MP2 turn off. When the voltage level of the first node N1 is low and the voltage level of the second node N2 is high, the second NMOS transistor MN2 and the first PMOS transistor MP1 turn off and the first NMOS transistor MN1 and the second PMOS transistor MP2 turn on. Accordingly, the boosted voltage VDD_HI of the source voltage VDD level charged in the second node N2 is applied to the capacitor CS. Here, the capacitor CS continuously charges and applies the boosted voltage VDD_HI to the output terminal.

The charge pump circuit 130 delivers current through the transistors MP1, MP2 during half periods of the pair of the internal clock signals ICK, ICKB. Since the plurality of charge pump circuits 130, 131, . . . , 132 are connected in parallel and phased in their operation, the amount of charge pumped by each charge pump circuit 130, 131, . . . , 132 can be reduced and the amount of ripple of the boosted voltage VDD_HI can be reduced.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A boost circuit, comprising:
   a plurality of charge pump circuits having outputs connected in common and that generate current pulses responsive to respective phased periodic signals; and
   a multi-phase periodic signal generator circuit that generates the phased periodic signals such that they have respective different phases;
   wherein the multi-phase periodic signal generator circuit comprises:
      a control signal generator circuit that produces a control signal responsive to a voltage produced by the plurality of charge pump circuits; and
      an oscillator circuit that generates the plurality of phased periodic signals responsive to the control signal;
   wherein the control signal generator circuit produces a control voltage responsive to a comparison of the voltage produced by the plurality of charge pump circuits to a desired value, and wherein the oscillator circuit comprises a voltage controlled oscillator circuit that varies a frequency of the phased periodic signals responsive to the control voltage;
   wherein the control signal generator circuit comprises:
      a differential amplifier circuit that produces the control voltage responsive to first and second voltages at first and second inputs of the differential amplifier circuit;
      a first voltage divider circuit that generates the first voltage from the voltage produced by the plurality of charge pump circuits; and a second voltage divider circuit that generates the second voltage from a power supply voltage; and wherein the differential amplifier circuit includes a feedback network that couples an output of the differential amplifier circuit to the first input.

2. A boost circuit, comprising:

a plurality of charge pump circuits having outputs connected in common and that generate current pulses responsive to respective phased periodic signals; and a multi-phase periodic signal generator circuit that generates the phased periodic signals such that they have respective different phases;

wherein the multi-phase periodic signal generator circuit generates respective pairs of complementary phased periodic signals with respective different phases, and wherein respective ones of the charge pump circuits receive respective ones of the complementary pairs of phased periodic signals; and wherein each of the charge pump circuits comprises:
first and second input nodes that receive first and second complementary phased periodic signals;
an output node;
a first transistor having a source terminal coupled to a power supply node, a drain terminal coupled to a first internal node and a gate terminal coupled to a second internal node;
a second transistor having a source terminal coupled to the power supply node, a drain terminal coupled to the second internal node and a gate terminal coupled to the first internal node;
first and second inverters having inputs coupled to respective ones of the first and second input nodes;
first and second capacitors that couple respective outputs of the first and second inverters to respective ones of the first and second internal nodes;
a third transistor having a drain terminal coupled to the first internal node, a source terminal coupled to the output node, and a gate terminal coupled to the second internal node; and
a fourth transistor having a drain terminal coupled to the second internal node, a source terminal coupled to the output node, and a gate terminal coupled to the first internal node.

* * * * *